8075X
J. L. DUTTON.
Heating Buildings.
Patented March. 13, 1834.
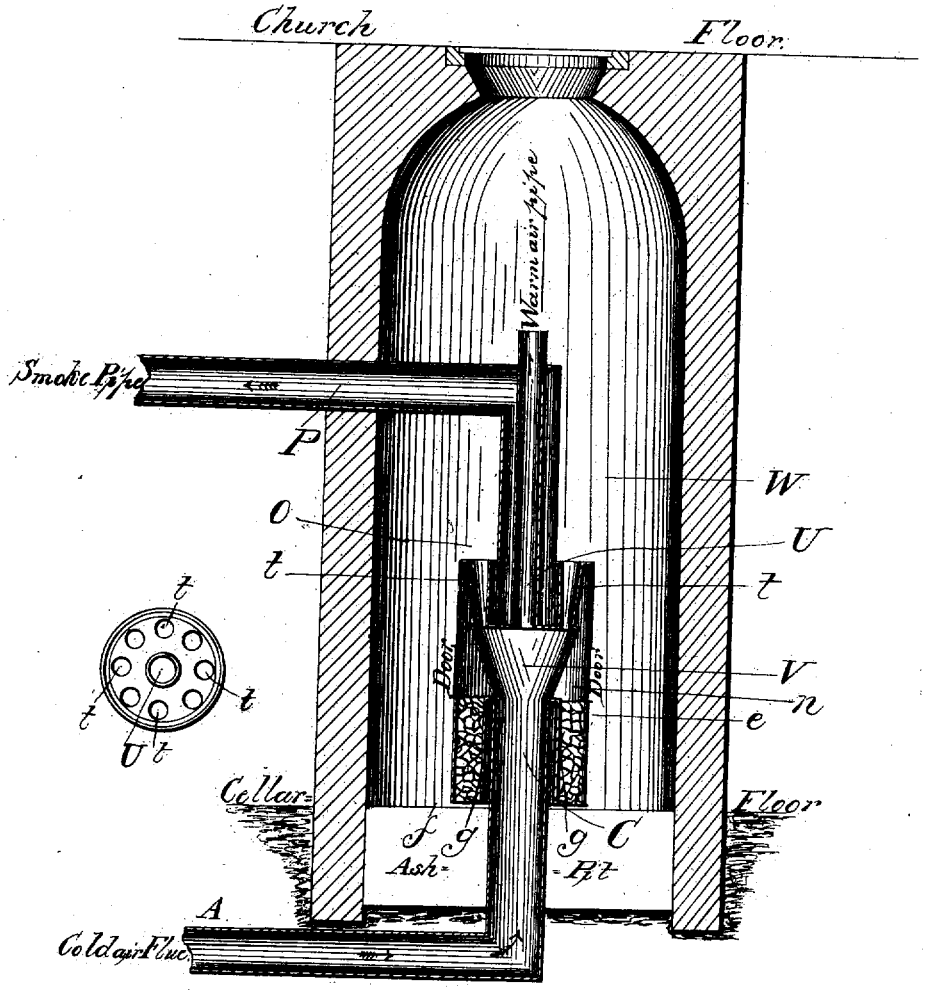
THE NATIONAL LITHOGRAPHING COMPANY,
WASHINGTON, D. C.

3/13/1834 8075X

Av. 14

Mar 13 1834

Joseph L. Dutton 8075X

Letters Patent March 13. 1834.

The Schedule referred to in these Letters Patent and making part of the same containing a description in the words of the said Joseph L. Dutton himself of his improvement in the method of generating warm air for heating buildings and for other purposes.

To all to whom these presents shall come. Be it known that I Joseph L. Dutton of the City of Philadelphia and State of Pennsylvania have invented a new and useful improvement in the method of generating warm air for heating buildings or [illegible] rooms or other purposes and that the following is a full and exact description of said improvement. It consists in bringing into contact with either the ignited fuel itself or the surface of the containing vessel a greater quantity of cold air than has been hitherto done by the usual arrangement. This is effected by introducing through the mass of the ignited fuel an opening or tube C by which an additional column of cold air is admitted from the exterior at A. The air after being warmed in its passage through this opening rises by means of the tubes C C, and U into the warm air chamber W W thence to be diffused as afterwards required along with that collected by the usual process viz. by contact with the exterior only of the fire. To prevent the tube C from being too rapidly corroded by the [illegible] it is kept from actual contact with the fire by an intervening [illegible] S S which may (by means of a handle) be removed at [illegible] the [illegible] and the other. What I claim as new and as my own improvement and for which I ask an exclusive privilege is, the introduction of an interior column of cold air and its application either to [illegible] furnaces &c of the usual construction (which is readily practicable) [illegible] other apparatus for obtaining heat, together with the moveable [illegible] [illegible] the [illegible]

Joseph L. Dutton

Witnesses

[illegible]

[illegible]

Drawing

E. L.

C.J.W.